United States Patent [19]
Buchinski et al.

[11] 3,740,828
[45] June 26, 1973

[54] METHOD FOR MAKING STAINLESS STEEL-ALUMINUM COMPOSITE MATERIAL

[75] Inventors: Joseph J. Buchinski, Wrentham; Charles H. Zenuk, Acton, both of Mass.

[73] Assignee: Texas Instruments Incorporated, Dallas, Tex.

[22] Filed: May 28, 1971

[21] Appl. No.: 148,059

[52] U.S. Cl. .................. 29/470.1, 29/487, 29/497.5
[51] Int. Cl. ......................................... B23k 21/00
[58] Field of Search ................... 29/497.5, 504, 197, 29/196.2, 470.1, 487

[56] References Cited
UNITED STATES PATENTS

| | | | |
|---|---|---|---|
| 2,782,498 | 2/1957 | Mushovic et al. ................ | 29/497.5 |
| 3,210,840 | 10/1965 | Ulan ................................. | 29/497.5 X |
| 3,269,004 | 8/1966 | Smith, Jr. et al. ............... | 29/497.5 X |
| 3,295,197 | 1/1967 | Bunn et al. ....................... | 29/497.5 |
| 3,300,838 | 1/1967 | Slater et al. ...................... | 29/504 X |
| 3,340,597 | 9/1967 | Stein et al. ....................... | 29/504 X |
| 3,350,772 | 11/1967 | Ulam et al. ...................... | 29/497.5 X |
| 3,400,450 | 9/1968 | Nock, Jr. et al. ................ | 29/504 X |
| 3,481,023 | 12/1969 | Jost et al. ......................... | 29/497.5 X |
| 1,667,787 | 5/1928 | Jaeger et al. ..................... | 29/196.2 |
| 3,470,607 | 10/1969 | Roder et al. ..................... | 29/470.1 |
| 3,646,591 | 2/1972 | Thomas et al. .................. | 29/497.5 X |
| 3,648,353 | 3/1972 | Anderson ......................... | 29/497.5 X |

FOREIGN PATENTS OR APPLICATIONS

| | | | |
|---|---|---|---|
| 575,563 | 5/1959 | Canada ............................ | 29/470.1 |

Primary Examiner—J. Spencer Overholser
Assistant Examiner—Ronald J. Shore
Attorney—Harold Levine, Edward J. Connors, Jr., John A. Haug, James P. McAndrews and Gerald B. Epstein

[57] ABSTRACT

A process for metallurgically bonding stainless steel to aluminum at room temperature to provide a composite material having excellent formability properties and having a high quality stainless steel surface finish is shown to include the steps of squeezing strips of stainless steel and aluminum materials together between pressure bonding rolls while driving one roll in engagement with the stainless steel material at a selected peripheral speed, preferably without use of a lubricant between the roll and stainless steel material, and while regulating rotation of the other roll in engagement with the aluminum material at a relatively slower peripheral speed for reducing the thickness of at least the aluminum material to an extent sufficient to form incipient solid-phase metallurgical bonds between the materials, the bonded materials then being sintered in the solid-phase for increasing the strength of the metallurgical bonds between the stainless steel and aluminum materials.

5 Claims, 4 Drawing Figures

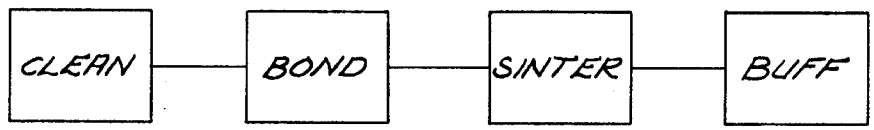
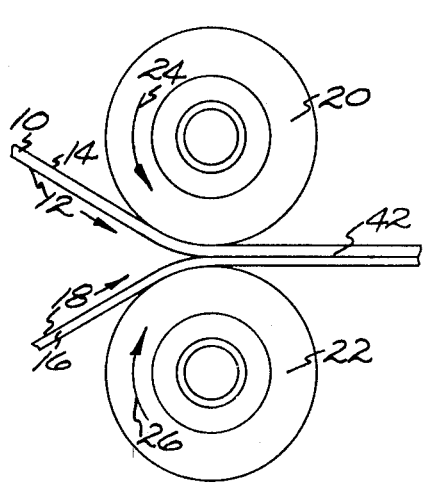
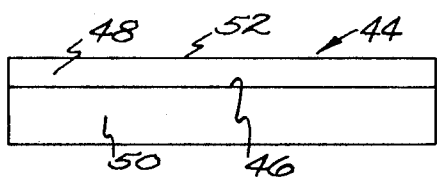
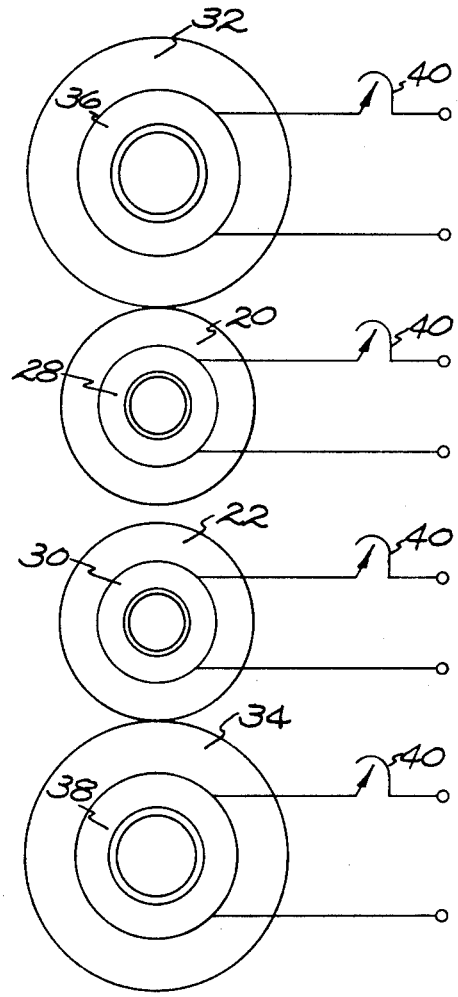

METHOD FOR MAKING STAINLESS STEEL-ALUMINUM COMPOSITE MATERIAL

Stainless steel strips to be used in making automotive trim materials and the like are available in relatively soft or annealed condition with relatively high quality surface finishes. These materials are easily formed into appropriate trim configurations and, when mounted on automotive bodies or the like, are adapted to withstand severe corrosion conditions over long periods of time without losing their quality of surface finish. However, when stainless steel is mounted on a steel automotive body and when moisture is present, a galvanic couple is established between the stainless steel of the trim and the less corrosion-resistant steel material of the automotive body. The galvanic action which then occurs causes rapid corrosion of the automotive body resulting in rust staining of the body near the trim locations and in weakening of the trim attachment to the body. It has been proposed that aluminum backing materials be used on the stainless steel trims so that the aluminum material will corrode in preference to the steel of the automotive body, thereby avoiding rust staining of the body and weakening of the trim attachment to the body. However, it is found that conventional processes used for bonding aluminum to stainless steel are somewhat expensive to perform and tend to result in weak attachment of the aluminum to the stainless steel materials, to result in composite materials which are somewhat difficult to form into desired trim configurations, or to cause excessive deterioration in the quality of finish on the stainless steel components of the composite materials. That is, bonding processes which excessively work-harden the stainless steel materials or which create aluminum-iron intermetallic compounds at the interface between the stainless steel and aluminum components tend to make the composite materials difficult to form into trim configurations; bonding processes which produce such intermetallic compounds or which otherwise provide weakly bonded layers of metal in the composite material provide composite materials in which material layers tend to separate during forming of the composites into trim configurations; processes which subject the stainless steel materials to excessive temperatures and deformations tend to reduce the quality of stainless steel surface finishes; and processes which call for hot bonding of the materials or which require bonding to be performed in protective atmospheres tend to be relatively expensive to perform.

It is an object of this invention to provide novel and improved methods for making stainless steel-aluminum composite materials; to provide such processes in which the initial bonding of the stainless steel and aluminum materials is performed at room temperature; to provide such processes in which the initial bonding of the stainless steel and aluminum materials is performed without the use of protective atmospheres; to provide methods to produce such composite materials which are substantially free of aluminum-iron intermetallic compounds at the interfaces between the stainless steel and aluminum materials embodied therein; to provide such methods which produce composite materials in relatively soft or annealed condition to facilitate subsequent forming of the composite materials into appropriate trim configurations; to provide such methods which produce composite materials having strong bonds between the layers of the composite and having relatively high quality stainless steel surface finishes such that the materials can be used as automotive trim materials and the like with limited surface finishing of the stainless steel surface; and to provide such processes which can be conveniently and inexpensively performed.

Briefly described, the process of this invention includes the steps of providing stainless steel and aluminum materials in strip form, preferably in relatively soft or annealed condition with selected elongation properties and with relatively high quality surface finishes on the stainless steel material. After cleaning of the strips in conventional manner for removing bond-deterrent films and the like from the strip surfaces, the strip materials are brought into interfacial contact with each other and are squeezed together with selected force in an air atmosphere at room temperature between a pair of pressure bonding rolls. In accordance with this invention, the pressure bonding roll in engagement with the stainless steel material is rotatably driven at a selected peripheral speed developing relatively high torque while rotation of the other bonding roll in engagement with the aluminum material is regulated at a relatively slower peripheral speed developing substantially lower torque for advancing the stainless steel and aluminum materials between the pressure bonding rolls at selected speeds and for reducing the thickness of at least the aluminum material to an extent sufficient to form at least incipient, solid-phase, metallurgical bonds between the stainless steel and aluminum materials while avoiding any reduction of the thickness of the stainless steel material which significantly reduces or degrades the ductility, and particularly the tensile elongation properties, of the stainless steel. Preferably, the pressure bonding rolls are driven with a self-adjusting, torque-sharing arrangement such that the bonding roll engaging the stainless steel is rotated with a substantially uniform peripheral speed while the relatively lower peripheral speed of the other bonding roll is permitted to vary slightly to advance the stainless steel and aluminum materials between the bonding rolls with limited, uniform reduction in the thickness of the stainless steel material. The resulting, incipiently-bonded composite material is then sintered in the solid-phase at a temperature in the range from 350°F. to 900°F. for a sufficient period of time to strengthen the metallurgical bonds between the stainless steel and aluminum materials, to anneal the aluminum component of the bonded composite material, and, if necessary, to relieve stresses in the stainless steel component of the composite material. Preferably this sintering of the bonded material is performed in an air atmosphere at a relatively low temperature within the stated temperature range.

In this way, it is found that a strong, secure bond is achieved between the stainless steel and aluminum components of the composite material. The surface of the stainless steel component is free of strain lines and the original high quality of the stainless steel surface finish is either retained or is easily restored by buffing of the composite material. The stainless steel and aluminum components are each in soft or annealed condition in the composite material and the interface between the components is free of aluminum-iron intermetallic compounds so that the composite material is readily formed into desired trim configurations. Further, as the principal bonding steps are performed in air at room temperature, the bonding process is inexpensive to perform.

Other objects, advantages and details of the process of this invention appear in the following detailed description of preferred embodiments of the invention, the detailed description referring to the drawings in which:

FIG. 1 is a block diagram indicating the general nature of the process of this invention;

FIG. 2 is a diagrammatic view illustrating principal features of the process of this invention;

FIG. 3 is a partial diagrammatic view illustrating a principal feature of a preferred embodiment of the process of this invention; and FIG. 4 is a side elevation view of the product of the process of this invention.

As shown in FIG. 1 of the drawing, the process provided by this invention for producing composite stainless steel-aluminum material suitable for use in making automotive trims and the like includes the general steps of cleaning the materials to be bonded for removing bond-deterrents from the material surfaces, initially bonding the starting materials together, sintering the initially-bonded materials for increasing the strength of the bond between the materials, and, if desired, buffing the resulting bonded composite material for improving the quality of finish on the stainless steel surface of the composite material.

The stainless steel and aluminum starting materials used in the bonding process of this invention are preferably provided in strip form. That is, the starting materials preferably comprise relatively long but narrow and thin lengths of metal which can be stored in coils and which can be readily fed from the coils through cleaning and bonding apparatus. HOwever, when strip materials are described herein, it should be understood that, where appropriate, this term also includes sheets of the starting materials having relatively greater widths or thicknesses such as would prevent coiling of the materials.

In accordance with this invention, the starting materials are preferably provided in dead soft, fully annealed condition where the materials display substantial elongations. The term elongation as used herein refers to a property of the metal materials to display a stated percentage increase in length of a 2 inch long test specimen measured after fracture of the specimen in a tensile test. Preferably, for example, the stainless steel starting materials are provided in less than 25 percent full hard condition having elongations of at least 10 percent and preferably having elongations of at least 20 percent. Similarly, the aluminum starting materials are preferably provided in less than 50 percent full hard condition having elongations of at least 10 percent and preferably having elongations of at least 30 percent.

Various stainless steel and aluminum starting materials are used within the scope of this invention including Stainless Steels identified by the designations AISI (American Iron and Steel Institute) 201, 301, 302, 304, 430, 434 and 436 and including Aluminum Alloys bearing the designations Alloy 1100, 3003, 5052 and 5056 (U. S. Government Alloy Numbers) and C22 (designation of Aluminum Company of America). These stainless steel and aluminum starting materials have compositions, by weight, as set forth in Tables I and II respectively.

In accordance with this invention, the stainless steel starting materials, preferably have a relatively high quality surface finish suitable for use, with minimal polishing or buffing, for various trim purposes. For example, the stainless steel starting material desirably has at least one side surface having at least a No. 2B surface finish as specified by The American Iron and Steel Institute (AISI) and preferably has at least one side surface having a No. 3 surface finish. Alternately, however, higher quality surface finishes up to No. 8 (AISI) surface finish are provided on the starting stainless steel material within the scope of this invention. As will be understood, a No. 2B surface finish is a bright, cold-rolled surface finish such as would be provided by a light pass of the material through a rolling mill having polished rolls. A No. 3 surface finish comprises a surface finish having a roughness not greater than that of the No. 2B surface finish where some polishing of the surface has been performed to increase reflectivity of the surface. A No. 8 surface finish comprises a highly reflective finish such as would result from extensive polishing of the stainless steel surfaces with very fine buffing compounds.

Various conventional techniques are employed for cleaning the starting materials within the scope of this invention, appropriate techniques being employed as

TABLE I (STAINLESS STEEL COMPOSITIONS)

| | Carbon (max.) | Manganese (max.) | Silicon (max.) | Chromium | Nickel | Phosphorous (max.) | Sulphur (max.) | Nitrogen (max.) | Iron |
|---|---|---|---|---|---|---|---|---|---|
| 201 | 0.15 | 7.50 | 1.00 | 16.00–18.00 | 3.50–5.50 | 0.06 | 0.030 | 0.25 | Bal. |
| 301 | 0.15 | 2.00 | 1.00 | 16.00–18.00 | 6.00–8.00 | 0.045 | 0.030 | | Bal. |
| 302 | 0.15 | 2.00 | 1.00 | 17.00–19.00 | 8.00–10.00 | 0.045 | 0.030 | | Bal. |
| 304 | 0.08 | 2.00 | 1.00 | 18.00–20.00 | 8.00–12.00 | 0.045 | 0.030 | | Bal. |
| 430 | 0.12 | 1.00 | 1.00 | 14.00–18.00 | | 0.040 | 0.030 | | Bal. |
| 434 | 0.12 | 1.00 | 1.00 | 14.00–18.00 | | 0.040 | 0.030 | | Bal.* |
| 436 | 0.12 | 1.00 | 1.00 | 14.00–18.00 | | 0.040 | 0.030 | | Bal.* |

*Type 434 and Type 436 Stainless Steels incorporate 0.75–1.25 percent, by weight, of molybdenum and Type 436 Stainless Steel additonally incorporates 0.40–0.60 percent, by weight, of cobalt plus tantalum.

TABLE II (ALUMINUM ALLOY COMPOSITIONS)

| | Magnesium | Manganese | Chromium | Silicon (max.) | Iron (max.) | Copper (max.) | Zinc (max.) | Other (max.) | Aluminum |
|---|---|---|---|---|---|---|---|---|---|
| 1100 | | | | | | | | | Bal. |
| 3003 | | 1.0–1.5 | | 0.60 | 0.70 | 0.20 | 0.10 | 1.00 | Bal. |
| 5052 | 2.2–2.8 | 0.10 max | 0.15–0.35 | 0.45 | | 0.10 | 0.10 | 0.15 | Bal. |
| 5056 | 4.5–5.6 | 0.05–0.20 | 0.05–0.20 | 0.30 | 0.40 | 0.10 | 0.10 | 0.15 | Bal. |
| C22* | | 0.01 | | 1.23 | 0.46 | 0.01 | | | Bal. |

*Nominal composition.

known in the art for removing dirt, oils, greases, bond-deterring oxide films and the like from the material surfaces. For example, the stainless steel materials are preferably subjected to a conventional bright annealing step wherein the material is heated to a temperature on the order of 1425-1550° F. to remove gross contaminants and bond-deterrents from the material surfaces. The aluminum starting materials are subjected to scrubbing for removing gross contaminates from the aluminum surfaces and are also subjected to appropriate treatment for substantially completely removing bond-deterrent oxide films from the materials. For example, the aluminum starting materials are preferably cleaned in the manner described in U.S. Pat. No. 2,709,142 wherein wire brushing of the aluminum surfaces is employed. The aluminum materials are preferably retained in coiled form in a relatively dry atmosphere after cleaning and are preferably utilized in the bonding process of this invention within about one day after cleaning thereof. As will be understood, where the starting materials are to be used in forming a two layer laminate or composite material, only a single surface of each of the starting materials need be cleaned.

In accordance with the process of this invention as illustrated in FIG. 2, a strip 10 of the starting stainless steel material having at least one clean strip surface 12 and at least one strip surface 14 with a high quality surface finish and a strip 16 of the aluminum starting material having at least one clean strip surface 18 are advanced from pay-off reels or the like (not shown) into interfacial contact with each other between a pair of pressure bonding rolls 20 and 22. Preferably, the strip of aluminum material is slightly narrower than the strip of stainless steel material. The strips are preferably advanced into such interfacial contact at room temperature without preheating of the strips. However, if desired for greater uniformity of strip temperatures during bonding where the bonding reductions will generate some heat in the strip materials, the strip materials can be preheated to a temperature preferably not exceeding about 250° F. Further, for reasons of convenience and economy, the strips are preferably advanced into interfacial contact with each other in an air atmosphere. However, any substantially neutral or reducing atmosphere can be arranged to surround the strip materials as they are advanced toward the bonding rolls if desired.

In accordance with this invention, the strip materials 10 and 16 are to be squeezed together and advanced between the pressure bonding rolls 20 and 22 by driving rotation of at least one of the rolls, the squeezing and advancing of the strip materials being regulated for reducing the thickness of at least the aluminum material to an extent sufficient to form at least incipient metallurgical bonds between the strips while avoiding such reduction of the stainless steel materials as would create strain lines or would otherwise significant reduce the quality of the stainless steel surface finish. In this regard, it is noted that the squeezing and advancing of the strip materials which will occur between the bonding rolls will be influenced by the peripheral speed of the bonding rolls, by the pressure with which the rolls are forced toward each other, by the drag or back tension exerted on the strip materials as they are advanced to the rolls, by the front tension applied to the bonded materials leaving the rolls, by the relative hardness of the strip materials, by the nature of the surface finishes on the bonding rolls and the lubricants, if any, used between the rolls and the strip materials, and, where one or more of the rolls is not positively driven, by the weight of the rolls themselves.

In the preferred embodiment of this invention, the pressure bonding rolls are provided with chrome-plated polished surfaces and a conventional lubricant is used between the aluminum strip material 16 and the roll 22. While a lubricant may also be used on the stainless steel material, it is preferred in accordance with this invention that no lubricant be used between the stainless steel strip 10 and the roll 20. The rolls are preferably formed of hardened steel and preferably have diameters in the range from 3 to 14 inches. In addition, in the preferred embodiment of the process of this invention, the rolls are forced toward each other with sufficient force to create pressures on the order of 100,000 to 200,000 pounds per square inch at the interface between the strip materials at a location between the pressure bonding rolls. Further, the back tension applied to the strip materials being advanced to the bonding rolls is limited to the back tension which is required for properly guiding the strip materials to the rolls, the back tension being so limited that it has little significant effect upon the advancement of the strips between the bonding rolls.

In this arrangement, it is an important part of the process of this invention that the bonding roll 20 in engagement with the stainless steel strip 10 is rotatably driven at a selected peripheral speed as indicated in FIG. 2 by the arrow 24 and the rotation of the other bonding roll 22 in engagement with the aluminum strip 16 is regulated at a relatively lower peripheral speed as indicated in FIG. 2 by the arrow 26. That is, the relative peripheral speeds of the bonding rolls are regulated with respect to the other factors influencing squeezing and advancement of the strip materials between the rolls such that relatively greater torque is applied by the roll 20, whereby the strip materials are squeezed and advanced to provide limited or no reduction in the thickness of the stainless steel material while providing sufficient reduction in the thickness of at least the aluminum material to form at least incipient, solid-phase, metallurgical bonds between the strip materials. Preferably the roll torques and speeds are regulated so that no more than about 7 percent reduction occurs in the thickness of the stainless steel strip material. In this regard, it is noted that the relative peripheral speeds of the bonding rolls must be regulated to minimize slippage between the stainless steel material and the roll 20 and to advance the stainless steel material at a rate such that the reduction in thickness, if any, brought about in the stainless steel material is substantially uniform throughout the length of the strip 10, thereby to avoid the formation of scuff marks or strain lines in the stainless steel and to avoid other deleterious effects on the quality of the stainless steel surface finishes. On the other hand, the relative peripheral speeds of the bonding rolls must be regulated to advance the strips at rates adequate to bring about at least about 5 percent reduction in the thickness of the aluminum strip material, and preferably from about 10 to 50 percent reduction in the aluminum strip thickness, for assuring formation of at least incipient, solid-phase metallurgical bonds between the strip materials. In this regard, it is noted that this greater reduction in the aluminum material than in the stainless steel material brings about a sliding action between the strip materials which facilitates formation of the desired metallurgical bond. The slightly narrower width of the aluminum strip material relative to the strip of stainless steel material assures that the aluminum material does not contact the roll 20 engaging the stainless steel and thereby avoids any sticking of aluminum material to the roll 20 such as might tend to cause marking or scarring of the stainless steel strip surface. The term metallurgical bond refers to a bond which results from interatomic attraction between the stainless steel and aluminum materials as distinguished from a bond resulting from mere mechanical interlocking of portions of the strip materials, incipient metallurgical bonds being bonds formed between the strips over less than the full area of interfacial contact between the strip materials.

In practice of this invention, regulation of the relative peripheral speeds of the bonding rolls to meet the process requirements of this invention as above-described is readily accomplished in either of three different ways using generally conventional roll bonding apparatus. That is, the bonding rolls 20 and 22 are each positively driven, as by being geared together, to rotate at selected different peripheral speeds as above described. Alternately, only the pressure bonding roll 20 in engagement with the stainless steel material 10 is directly driven at a selected peripheral speed while the other bonding roll 22 is permitted to rotate at a relatively slower peripheral speed in response to movement of the strip materials, the rate of rotation of the roll 22 in this case being primarily influenced by the percentage reduction achieved in the aluminum strip material. As will be understood, the bonding roll 20 is driven at a peripheral speed which is selected to provide the desired difference in peripheral speeds between the rolls 20 and 22.

In the preferred embodiment of this invention however, the bonding rolls 20 and 22 are each directly driven under a torque-sharing arrangement such as is diagrammatically illustrated in FIG. 3. That is, electrical motors 28 and 30 arranged to drive bonding rolls 20 and 22 respectively and electrical motors 32 and 34 arranged to drive back up rolls 36 and 38 respectively are regulated for controlling the torque developed by each of the rolls, armature current of the motors being adjusted relative to each other by rheostat means or the like 40 for applying greater torque to the roll 20 than to the roll 22, thus resulting in the desired peripheral speed relationship of the rolls as above-described.

In any of the above-described arrangements for rotating the pressure bonding rolls, it is possible to rotatably drive the bonding roll 20 at a selected peripheral speed while regulating rotation of the bonding roll 22 at a relatively slower peripheral speed to advance the stainless steel strip material between the rolls without significantly reducing the stainless steel material while at the same time advancing the aluminum material with sufficient reduction in the thickness thereof to produce at least incipient metallurgical bonding between the strip materials, thereby to form the initially-bonded composite material indicated at 42 in FIG. 2.

In accordance with this invention, the initially bonded composite material 42 is preferably coiled on a take-up reel (not shown), preferably with paper or similar material interleaved between the coil convolutions, and, when an appropriate quantity of material is coiled, the coil of initially-bonded composite material is moved to a conventional bell annealing furnace or the like where the initially bonded material is sintered at a temperature in the range from about 350° F. to about 900° F. for a sufficient period of time to strengthen the bonds between the stainless steel and aluminum materials, to restore the aluminum component of the composite material to substantially fully annealed condition after the work-hardening thereof which has occurred in the above-described bonding step, and, if any work-hardening of the stainless steel component has resulted from said bonding, to at least induce some stress relief in the stainless steel material. It will be understood that, while the initially-bonded composite material is preferably sintered in a bell annealing furnace because of the length of the sintering periods on the order of 30 minutes to 4 hours generally required for producing maximum bond strength between the stainless steel and aluminum at the noted sintering temperatures, other conventional heat treatment techniques can also be employed for sintering the initially-bonded composite within the scope of this invention. As will be understood, the sintering is preferably performed in an air atmosphere where the sintering temperatures utilized are below about 450° F. but, where higher sintering temperatures are utilized, any conventional neutral or reducing atmosphere is preferably established around the initially-bonded composite during sintering thereof.

In accordance with this invention, as indicated in FIG. 1, the sintered and more fully bonded composite material produced by the method of this invention is then preferably buffed and polished in conventional manner for restoring or improving the quality of the stainless steel surface finish on the composite material as required. Generally speaking when the process of this invention is utilized, restoration of the quality of surface finish displayed by the stainless steel starting material is easily accomplished with minimal buffing. Even where the starting material had been provided with a high reflectivity surface finish such as a No. 8 (AISI) finish, the high quality initial surface finish of the stainless steel is fully restored after polishing or buffing with little difficulty.

In this way, using the process of this invention, it is possible to produce composite stainless steel-aluminum material such as is illustrated at 44 in FIG. 4. This material displays little or no aluminum-iron intermetallic compound formation along the interface 46 between the stainless steel 48 and aluminum 50 components of the composite material and each of the material components is in substantially fully annealed condition so that the composite material is easily formed into various desired trim configurations and the like. Using the process of this invention, it is readily possible to provide composite materials having elongations in the range from 3 to 50 percent. The stainless steel and aluminum components of the composite are securely bonded together and do not tend to separate during forming of the noted trim configurations. Most important, the stainless steel component is free of strain lines and displays a high quality, highly reflective surface 52 suitable for automotive trim purposes and the like. Further, the process for making the composite material 44 is relatively inexpensive to perform. The stainless steel and aluminum components of the composite material can comprise from 5 percent to 95 percent of the total thickness of the composite material as desired.

For example, in a preferred embodiment of this invention, a strip of No. 434 stainless steel having a width of 12 inches and a thickness of 0.010 inches in dead-soft, fully annealed condition and having a No. 2B (AISI) surface finish and a strip of 3003 Aluminum Alloy having a width of 11.5 inches and a thickness of 0.025 inches in dead-soft, fully annealed condition were each cleaned in the manners specifically described above for removing bond-deterrent materials from the strip surfaces. Cleaned surfaces of the strips were then brought into interfacial contact with each other between a pair of 8 inch diameter pressure bonding rolls having polished, chrome-plated roll surfaces, the rolls being forced together with an applied force of approximately 400,000 pounds to establish a compressive force on the order of 120,000 pounds per square inch at the interface between the strip materials at the location between the rolls. The bonding rolls were then rotatably driven in a torque-sharing arrangement such as has been described with reference to FIG. 3 with no lubricant being used between the stainless steel material and the roll engaging the stainless steel and with a conventional lubricant being used between the aluminum material and the roll engaging the aluminum material, the roll engaging the stainless steel strip being driven at a peripheral speed of 30 feet per minute while the roll engaging the aluminum material was rotatably driven at a peripheral speed of 25–28 feet per minute. The strip materials were then advanced between the rolls for initially-bonding the strips together. Thereafter, the initially-bonded composite was sintered for 30 minutes in a reducing atmosphere of cracked city gas in a bell annealing furnace at a temperature of 450° F. The resulting bonded composite material was then buffed for 0.25 to 0.50 minutes in five stages using conventional buffing compounds for providing the stainless steel surface of the composite material with a No. 8 (AISI) surface finish. The composite material was found to have a bond peel strength exceeding 75 pounds per inch of width and the interface between the stainless steel and aluminum components was found to be free of aluminum-iron intermetallic compounds. The stainless steel and aluminum materials in the composite had thicknesses of 0.0095 inches and 0.013 inches respectively for a total composite thickness of 0.0225 inches, each of the component materials being in substantially annealed condition. The stainless steel material was completely free of strain lines and had a high reflectivity suitable for automotive trim applications.

In another example, a strip of AISI Type 434 Stainless Steel having a width of 12 inches and a thickness of 0.009 inches in dead soft, fully annealed condition and having a No. 2B (AISI) surface finish and a strip of composite aluminum material having a width of 11.25 inches were each cleaned in the manners specifically described above for removing bond-deterrents from the strip surfaces, the composite aluminum material comprising a layer of 5052 Aluminum Alloy metallurgically bonded to a layer of C22 Aluminum Alloy in any conventional manner to provide a strip material having a total thickness of 0.025 inches wherein the layer of C22 Aluminum Alloy has a thickness of about 0.0025 inches. A cleaned surface of the stainless steel strip material is then brought into interfacial contact with the cleaned surface of the composite aluminum material which is formed by the C22 Aluminum Alloy, the contacting stainless steel and aluminum strips being forced together between a pair of 7 inch diameter pressure bonding rolls. The roll engaging the stainless steel strip material has a mirror finish chrome plated surface whereas the roll engaging the aluminum strip material has a smooth, unplated, hardened steel surface. The contacting strip materials are advanced between the rolls while the rolls are forced together with an applied force of approximately 448,000 pounds, the bonding rolls engaging the stainless steel strip being rotatably driven with no lubricant being used between the stainless steel strip and the roll engaging that strip while a conventional lubricant is used between the aluminum strip and the roll engaging the aluminum strip. The roll engaging the stainless steel strip is rotatably driven at a peripheral or surface speed of 15 feet per minute while the roll engaging the aluminum strip material, without being directly driven, is regulated in the manner described above to rotate at a speed of approximately 12.6 feet per minute, thereby to solid-phase metallurgically bond the two strip materials together. The resulting bonded composite strip material is then heated in a bell annealing furnace in an atmosphere of cracked city gas for 30 minutes at a temperature of about 450° F. for sintering the composite material. The stainless steel surface of the composite material was then buffed for approximately one-half minute with conventional buffing compounds. The resulting composite material has a total thickness of 0.022 inches with the thickness of the stainless steel layer having a thickness of 0.0087 inches. The composite material is found to have a strong bond displaying approximately 75 pounds bond peel strength per inch of width, the bond interface between the stainless steel and aluminum layers of the composite being substantially free of aluminum-iron intermetallic compounds. The stainless steel and aluminum materials of the composite are each in at least substantially annealed condition and the composite material displays a elongation of approximately 25 percent. The stainless steel surface of the composite is free of strain lines and other surface-degrading blemishes and has a high reflectivity suitable for use on automotive trim applications.

It will be understood that in the process of this invention, the actual peripheral speeds at which the described pressure bonding rolls are rotated will depend to a large extent upon the nature of the conventional bonding apparatus used, suitable peripheral speeds for the bonding roll engaging the stainless steel strip material ranging from 10 feet per minute to over 250 feet per minute depending on the nature and capacity of the bonding apparatus. It should be understood that although particular embodiments of the process of this invention have been described by way of illustration, this invention includes all modifications and equivalents thereof falling within the scope of the appended claims.

What is claimed is:

1. A method for making a composite stainless steel-aluminum material suitable for use in making automotive trims and the like, said method comprising the steps of providing a strip of stainless steel material in less than 25 percent full hard condition having an elongation of at least 10 percent, providing a strip of aluminum material in less than 50 percent full hard condition having a elongation in the range from 10 to 50 percent, cleaning at least one strip surface of said aluminum material and at least a strip surface of said stainless steel material for removing bond-deterrent materials from said surfaces, interfacially contacting said clean strip surfaces with each other and squeezing said strips together at room temperature between a pair of pressure bonding rolls, rotatably driving at least one of said rolls in engagement with said stainless steel strip material with selected torque at a selected peripheral speed while regulating rotation of the other of said rolls in engagement with said aluminum strip material with relatively lower torque at a relatively slower peripheral speed for advancing said strip materials between said rolls without more than about 7 percent reduction in thickness of said stainless steel material and without exceeding the elongation property of said stainless steel material while reducing the thickness of said aluminum strip material at least 5 percent to metallurgically bond said strip materials together to form an initially-bonded composite material, said engagement of said one roll with said stainless steel material being free of lubricant, and heating said initially-bonded composite material for a period from 30 minutes to 4 hours at a temperature in the range from 350° F. to 900° F. for improving the strength of said bond between said stainless steel and aluminum materials.

2. A method as set forth in claim 1 wherein said stainless steel strip material has a surface finish at least as fine as No. 2B (AISI) prior to said bonding and said composite material is buffed after said bonding for providing said stainless steel material with a surface finish at least as fine as No. 2B (AISI).

3. A method as set forth in claim 1 wherein said stainless steel strip material is selected from the group consisting of the stainless steel alloys set forth in Table I in the specification hereof, which Table I is incorporated in this claim by this reference, wherein said aluminum strip material is selected from the group consisting of the aluminum alloys set forth in Table II in the specification hereof, which Table II is incorporated in this claim by this reference.

4. A method for making a composite stainless steel-aluminum material suitable for use in making automotive trim and the like, said method comprising the steps of cleaning at least one surface of a strip of Type 434 Stainless Steel material in fully annealed condition and at least one surface of a strip of 3003 Aluminum Alloy material for removing bond-deterrent materials from said surfaces, interfacially contacting said strip surfaces with each other and squeezing said strip materials together at room temperature between a pair of pressure bonding rolls, rotatably driving at least one of said rolls in engagement with said stainless steel strip material with selected torque at a selected peripheral speed while regulating rotation of the other of said rolls in engagement with said aluminum strip material with relatively lower torque at a relatively slower peripheral speed for advancing said strip materials between said rolls with about 5 percent reduction in the thickness of said stainless steel material and with about 50 percent reduction in the thickness of said aluminum strip material to metallurgically bond said strip materials together to form an initially-bonded composite material, said engagement of said one roll with said stainless steel material being free of lubricant, and heating said initially-bonded composite material at a temperature of about 450° F. for about 30 minutes for improving the strength of said bond between said stainless steel and aluminum materials.

5. A method for making a composite stainless steel-aluminum material suitable for use in making automotive trim and the like, said method comprising the steps of cleaning at least one surface of a strip of Type 434 Stainless Steel material in fully annealed condition and at least one surface of a strip of composite aluminum material embodying metallurgically bonded layers of 5052 Aluminum Alloy and C22 Aluminum Alloy for removing bond-deterrent materials from said surfaces, said cleaned surface of said composite aluminum strip material being formed by said C22 Aluminum Alloy, interfacially contacting said strip surfaces with each other and squeezing said strip materials together at room temperature between a pair of pressure bonding rolls, rotatably driving at least one of said rolls in engagement with said stainless steel strip material with selected torque at a selected peripheral speed while regulating rotation of the other of said rolls in engagement with said composite aluminum strip material with relatively lower torque at a relatively slower peripheral speed for advancing said strip materials between said rolls with about 3 percent reduction in the thickness of said stainless steel material and with about 50 percent reduction in the thickness of said aluminum strip material to metallurgically bond said strip materials together to form an initially bonded composite initially-bonded said engagement of said one roll with said stainless steel material being free of lubricant, and heating said initially-bonded composite material at a temperature of about 450° F. for about 30 minutes for improving the strength of said bond between said stainless steel and aluminum materials.

* * * * *